United States Patent [19]

Krueger et al.

[11] 4,269,480

[45] May 26, 1981

[54] PROCESS AND APPARATUS FOR DISPLAYING AN IMAGE IN FRONT OF AN OPTICAL CONTRASTING BACKGROUND

[75] Inventors: Hans Krueger, Munich; Alois Schauer, Gruenwald; Karl-Heinz Walter, Grafing, all of Fed. Rep. of Germany

[73] Assignee: Siemens Aktiengesellschaft, Berlin & Munich, Fed. Rep. of Germany

[21] Appl. No.: 961,730

[22] Filed: Nov. 17, 1978

[30] Foreign Application Priority Data

Nov. 29, 1977 [DE] Fed. Rep. of Germany ....... 2753203

[51] Int. Cl.$^3$ .............................................. G02F 1/01
[52] U.S. Cl. ................... 350/355; 350/356; 350/357
[58] Field of Search ............... 350/353, 355, 356, 357, 350/345

[56] References Cited

U.S. PATENT DOCUMENTS

| | | | |
|---|---|---|---|
| 3,317,266 | 5/1967 | Heller et al. | 350/357 |
| 3,656,835 | 4/1972 | Johnson et al. | 350/353 |
| 4,167,307 | 9/1979 | Cirkler et al. | 350/345 |

OTHER PUBLICATIONS

G. Baur et al., "Fluorescence-activated liquid-crystal display", APL, vol. 31, No. 1, Jul. 1, 1977, pp. 4–6.

*Primary Examiner*—James W. Davie
*Attorney, Agent, or Firm*—Hill, Van Santen, Steadman, Chiara & Simpson

[57] ABSTRACT

The present invention is directed to a process and display for producing an image in front of an optically contrasting background. The display installation is characterized by a preferably but not necessarily, plate-shaped body having exit windows for emitting light in given areas and light valves associated with each of the exit windows for controlling the light being emitted therefrom. The light valves include filters which have an absorption frequency range and the plate member emits light from the exit windows in an emission frequency range. One of the members, either the filter member or the plate member, can have its associated frequency range shifted by the application of an electrical field so that light can pass through the filter without being absorbed or is absorbed by the filter.

9 Claims, 2 Drawing Figures

PROCESS AND APPARATUS FOR DISPLAYING AN IMAGE IN FRONT OF AN OPTICAL CONTRASTING BACKGROUND

BACKGROUND OF THE INVENTION

1. Field of the Invention

The present invention is directed to a process and apparatus for displaying an image in front of an optically contrasting background by means of a display installation or device which has a plate-shaped body, which traps ambient light and emits it through exit windows, and has a light valve associated with each of the exit windows which is controllable to determine whether the light emitted from the exit windows is blocked or allowed to pass through the valve.

2. Prior Art

The use of image brightening fluorescent plates in a display which displays are also called fluorescent activated displays (FLAD) are known and have been described in U.S. patent application Ser. No. 747,035 filed Dec. 2, 1976 which issued as U.S. Pat. No. 4,142,781 and incorporates the disclosure of German Offenlegungsschrift No. 2,554,266. Also, such devices have been described in an article entitled "Bright and Economical", *Electronics Newspaper*, Mar. 25, 1977 and in an article in *Electronics* 6, (1977), page 55. The fluorescent plates discussed in the above mentioned references collects the bulk of the ambient light striking it by means of fluorescent absorption and emission with subsequent total reflection at its interfaces. The emitted fluorescent light is conducted in the interior of the plate and subsequently emitted through the special light exit or delivery windows, which may be created by roughening of the selected surface area or by the provision of notches. When a display unit with the display element aligned with each light delivery or exit window is located in front of such a plate, the luminous strength of the image display is increased by a factor which approximately corresponds to the ratio between the area of the light collecting surface of the plate and the area of the light emitting exit windows. In previously known FLAD devices, a field effect liquid crystal display with a twisted liquid crystal layer, for example, a rotary cell liquid crystal such as described in German Offenlegungsschrift No. 2,158,563, was provided as the light valve. Such a display, which utilizes the rotary cell has certain disadvantages, for example, a rotary cell has only a limited viewing angle zone, does not provide contrast gradations without substantial modifications and is supposed to be operated with a pure alternating voltage which can only be provided with extreme difficulties, particularly in a multiplex operation or mode which is increasingly being desired. It must be further noted that the manufacture of a rotary cell still demands special care and thus the mass production of displays utilizing rotary cells have not yet been completely successful.

SUMMARY OF THE INVENTION

The present invention is directed to providing an optical display utilizing the fluorescent activated display principle which display does not exhibit the above noted disadvantages.

To accomplish this task, the invention provides a display installation for displaying an image in front of an optical contrasting background comprising plate means for trapping ambient light and emitting light in the selected location through exit windows disposed in the plate means, said plate means including means for emitting light from the exit windows at an emission frequency range; light valves associated with each of the exit windows for blocking passage of light therefrom, said light valves including filter means for absorbing light in an absorption frequency range; one of the plate means and filter means having its frequency range being adjusted in response to an application of an electrical field thereto; and means for applying electrical fields to selected portions or areas of one of said means so that the selected area or portion is selectively switched between a light transmitting and a light blocking state. The process of the invention utilizes such a device and selectively applies the electrical field to obtain a change in the frequency range of either the plate means or the filter means.

In one embodiment of the invention, the light leaving each of the exit windows of the plate means has a constant emission frequency range and the filter means has an absorption frequency range which is altered by the application of the electrical field so that the absorption frequency range for the unexcited or rest state is different than that for the excited state.

In another embodiment, the filter means has substantially constant absorption range and the plate means has a layer or thin body of fluorescent material whose emission frequency range or spectrum is shifted by the application of an electrical field.

The proposed method of operation of the display can be characterized to the effect that the frequency-wise localized light beam is displaced on a frequency scale with respect to a similar frequency-wise localized aperture or frequency-wise localized transmission window to allow passage of the light through the aperture or window. In a similar manner, the frequency-wise transmission window or aperture can have its frequency shifted to allow the passage of the light beam. Therefore, the emission band or frequency range can also be further constricted by means of an additional measure such as by compression or band elimination. Should these alterations not be sufficient, then one still has the alternative of displacing both frequencies of the light and apertures simultaneously in opposite directions. In a normal case, the aperture in its switched-off or rest state will block out the light and when in the switched-on or excited state which occurs namely under the influence of a sufficiently large electric field release or allow passage of the light. It is also conceivable and may, in some certain instances, be more favorable on the standpoint of energy consumption to select a resting state in which the frequency of the fluorescent material of the plate means is different than the absorption frequency range of the light valve so that light passes while the light valve is in the rest state and the passage of the light is blocked due to overlapping of the absorption frequency range in the excited state with the emission frequency range of the fluorescent material. In this case, the display process utilizes or activates those portions of the image which are to be in the image background while the unactivated portions form the image. Such an operation is known as a complimentary activation and is one mode of operation of the device of the present invention.

It should be pointed out that the term "displacement of the fluorescent and/or absorption frequency ranges or bands" as used hereinabove in addition to pure displacement of an otherwise unaltered frequency bands also includes other band influences which lead in the result to the change of the optical hypothetical postulate which is required for the optical display. Also included here, for example, are displacements at the upper and lower limit frequencies such as the absorption edge of the absorption band or a band deformation in which the absorption maximum mitigates. The only thing that is essential to the invention is that these band or range alterations are based upon a pure field effect.

An inventive process in which the absorption frequency range of the light valve is to be displaced can be realized with the help of electrochromic display which may be solid-state display and exhibits a particular so-called Franz-Keldysch-effect as described in *Natural Science*, No. 13A, 1958, page 484 or the Stark-effect as described in U.S. Pat. No. 3,317,266. The field effect, which was construed as a tunnel effect by Franz and Keldysch for which this effect is named, consists in the fact that under the influence of high E-fields, the lower band edge of the absorption band in insulators or semiconductors is displaced in the direction of the longer wavelengths. The Stark-effect (linear and quadratic) manifests itself by an increase and displacement of the absorption maximum. Both phenomena are described in detail in a monograph by I. F. Chang, "Electrochromic and Electrochemichromic Materials and Phenomena", *IBM Research*, RC 5663 of Sept. 26, 1975 and particularly sections III.C and III.D. Moreover, in this article the application possibilities of the Franz-Keldysch-effect and the Stark-effect, which, in themselves, are extremely attractive as solid-state field effects with short switching times and nearly unlimited reproducibility, are viewed skeptically because the previously observed frequency displacements were too small. In such a case, Chang sees slim application possibilities in electro-optical displays with monochromatic light, for example the laser addressed displays as discussed on page 17, paragraph 2, and page 20, paragraph 2. Since, however, fluorescent substances are available which fluorescent substances are indeed excited in a broad spectral range but, nevertheless, emit very narrow frequency ranges, sufficient contrasts can be obtained with the inventive process. Should one decide within the framework of the invention to alter the emission band of the fluorescent particles instead of the light valve absorption band, then the light valve could be an optical filter in the form of an edge filter or a band pass filter. Such a display installation is likewise mechanically sturdy and relatively easy to fabricate.

DESCRIPTION OF THE PREFERRED EMBODIMENT

Figure 1:
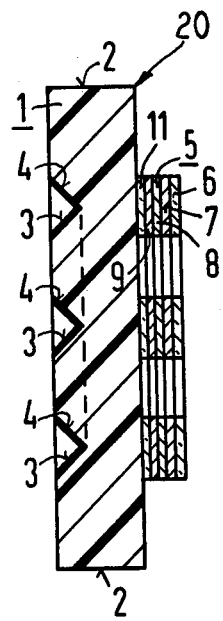
FIG. 1 is a cross-sectional view of the device in accordance with the present invention.

The principles of the present invention are particularly useful when incorporated in a display installation or device generally indicated at 20 in FIG. 1 for displaying an image in front of an optical contrasting background.

The display installation or device 20 is indicated as a one place numerical indicator. This display contains a fluorescent plate means 1, whose side faces bear a reflective layer 2 and whose back surface is provided with notches 3 in a pattern of a figure eight to form individual exit windows for each segment of the pattern. In the embodiment of FIG. 1, the individual windows have surfaces provided with dielectric mirrors 4. Display elements 5, which form individual light valves are disposed in line with each of the notches 3 on a front surface of the plate 1. Each of the display elements is an electrochromic display (ECD) and consists of several layers which as taken from the viewer are a diffuser 6, a front electrical conductive layer or electrode 7, an electrochromic layer 8, a rear electrically conductive layer or back electrode 9 and a cover layer 11 adjacent to the fluorescent plate. The layers 11 and 6 can be excluded, if desired.

The fluorescent plate 1 contains fluorescent particles, which are selected in such a manner that they have a narrow band emission spectrum of some 10 nm. Examples of such fluorescent substances, which are dissolved in liquids, are mentioned in a copending application Ser. No. 932,569 filed Aug. 10, 1978, U.S. Pat. No. 4,222,880, which includes the disclosure of German Patent Application No. P 27 42 899. In order to further restrict the fluorescent emission frequency range or band, the dielectric mirrors 4 are provided in such a manner that they only reflect about a 10 nm wide frequency range of the fluorescent light to the front and through the element 5 and allow the remaining frequencies of the fluorescent light to pass. The electrochromic layer 8 consists of a material that has a pronounced Franz-Keldysch-effect and has an absorption frequency band or range whose displaceable edges lie about at the upper limit frequency of the light or the emission frequency range or band being coupled from the light exit windows formed by the notches 3. With these band positions, each of the display elements 5 glow during a rest state in a specific chrominance. When one applies an electrical voltage to the display element 5 then the absorption edge of the electrochromic layer shifts into the frequency range or band being reflected by the dielectric mirrors and when a sufficiently strong E-field is provided, the absorption will block the entire light being reflected by the mirrors of the exit window 3. In this state, which is the excited state, the display element 5 appears dark. In keeping with the bright off and dark on condition, the display installation is considered a complimentary or inversely activated display.

Figure 2:
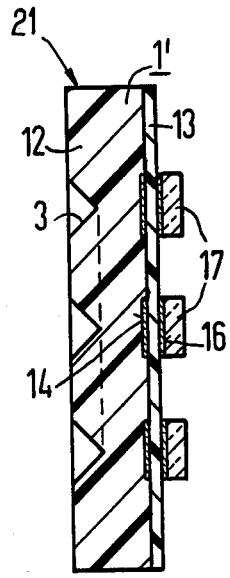
FIG. 2 is a cross-sectional view of an embodiment of the invention of the present invention.

An embodiment of the display is illustrated in FIG. 2 and generally indicated at 21. In the display 21, it is not the frequency aperture of the valve but rather the emission frequency range or band of the fluorescent plate which is displaced. In this embodiment, the fluorescent plate means 1' consists of a rear plate 12 and a front partial plate or fluorescent layer 13. The rear partial plate 12 contains the light delivery or exit windows in the form of notches 3 which do not have mirrors and is free of fluorescent particles. The fluorescent layer 13 contains a fluorescent substance addition and is moreover always enclosed between transparent conductive electrode layers 14 and 16 in an overlying area of the exit windows formed by the notches 3. Aligned with each of the notches is an optical filter 17, which is disposed on the front of the electrical conductive layer 16. The filters 17 may be cut off filters or spectral filters, such as interference filters which selectively allow the incident light of certain wavelengths to pass through.

The division of the fluorescent plate into a thick rear part 12 and a relatively thin front part 13 serves, on one hand, to enable one to easily subject the fluorescent substance in the region of the light delivery windows to relatively high field strengths and, on the other hand, produce the advantage that the fluorescent light is only slightly weakened because of so-called self-absorption on its path to the individual light delivery windows. In the embodiment of FIG. 2, the frequency range or band of the fluorescent particles is tuned to the transmission band of the optical filter in such a manner that the display elements appear dark in the off or rest condition and colored in an on or excited condition. Thus, in the rest condition the emission frequency range is the same as the absorption frequency range of the filter 17 but in an energized or switched-on condition the ranges are different.

In both embodiments, the fluorescent plate means is not covered by a single, large surface light valve but rather has separate small surface elements located only in front of the light exit windows. This geometry has the advantage that light can also enter into the plate through the large part of the front surface which is not covered by the display elements and thus provides a large collecting surface. A second common feature consists in the fact that the light valves in front of the individual light delivery windows have a relatively small constructional depth. With flat filters and particularly with flat liquid ECD's, the display information can still be easily read at an angle. Another essential feature of the two sample embodiments is the fact that they can be easily and economically manufactured and this advantage is of a particular consequence when the display is being produced at an industrial scale or in large quantities.

The invention is not limited to the sample embodiments which are illustrated. Thus, in particular, light valves also come into question whose absorption indicator can be influenced by means of other field effects in such a way that sufficient optical contrast can be generated in interaction with a fluorescent body. For example, it is possible in an SbSI crystal to displace the lower limit wavelength of the absorption band by nearly 10 nm in the direction of shorter wavelength (see *J. Phys. Chem. Solids,* 1962, Vol. 23, page 249). In *Modern Quantum Chem.,* Vol. 3, 1965, pages 45-65, a discussion is set forth on how the E-fields can influence the absorption behavior of liquid solutions. Moreover, one can dispense with the band constricting means such as the dielectric mirrors when the fluorescent spectrum itself is sufficiently narrow. This is to be expected above all in the case of solid-state solutions.

In the embodiment of FIG. 1, the emission frequency range of the plate 2 due to the dielectric mirrors 4 was substantially constant and slightly lower than the absorption range of the layers 8. If desired, the plate means which comprises the plate 2 and the exit windows 3 with the dielectric mirrors can be constructed so that the emission frequency range coincides with the absorption frequency range while in a rest or unexcited state so that light is blocked in the rest state but when energized the absorption frequency is shifted or lowered so that light can pass through the filter during the energized state. It is also possible when selecting the materials for the filter and the materials for the plate means to select them so that the absorption range will be slightly lower than the emission frequency range to allow light to pass through the valve in the rest state and is then shifted upward to absorb the light to go into a blocking mode of operation when energized.

In the embodiment of FIG. 2, the emission frequency range of the fluorescent layer 13 is changed by the application of an E-field, the emission frequency range could be tuned relative to the absorption frequency range of the filter so that in the off condition light will be conducted through the light valves and then will be blocked or absorbed when the energized state occured.

Although various minor modifications may be suggested by those versed in the art, it should be understood that we wish to embody within the scope of the patent warranted hereon, all such modifications as reasonably and properly come within the scope of our contribution to the art.

We claim:

1. A display installation for displaying an image in front of an optical contrasting background comprising plate means for fluorescently absorbing ambient light and emitting fluorescent light in a selected location through exit windows disposed in the plate means, said plate means including means for emitting fluorescent light from the exit windows at an emission frequency range; light valves associated with each of the exit windows for blocking passage of light therefrom, said light valves including filter means for absorbing light in a constant absorption frequency range; said plate means having its frequency range being adjusted in response to an application of electrical field thereto; and means for applying an electrical field to selected areas of said plate means so the selected area is selectively switched between a light transmitting and a light blocking state.

2. A display installation according to claim 1, wherein the filter means has a constant absorption frequency range and wherein the plate means comprises a back plate and a front partial body, said back plate being free of fluorescent particles and being provided on the back surface with light exit windows, said front partial body containing fluorescent particles and being provided with a front and back electrical conductive layer in the areas aligned with the light exit windows so that on an application of an electrical field to selected areas of the front partial body, the emission frequency range of the body is changed.

3. A display element according to claim 2, wherein each of the filter means of the light valves is a cut-off filter.

4. A display installation according to claim 2, wherein the filter means is a band pass filter particularly a band pass filter formed by an interference filter.

5. A display installation according to claim 1, wherein the filter means for each of the light valves covers only the area of the exit window associated therewith.

6. A process for the displaying of an image in front of an optical contrasting background comprising providing a display installation having plate means for fluorescently absorbing ambient light and emitting fluorescent light in a selected location through exit windows disposed in the plate means, said plate means including means for emitting fluorescent light from the exit windows at an emission frequency range, light valves associated with each of the exit windows for blocking passage of light therefrom, said light valves including filter means for absorbing light in an absorption frequency range; the plate means having its frequency range being adjusted in response to an application of an electrical field thereto and means for applying an electrical field to individual selected areas of said plate means; displaying an image on said installation by selectively applying an electrical field to selected areas of the plate means to cause a change in the frequency range of the fluorescent light to change the transmission characteristics of the light valve to control the image being displayed.

7. A process according to claim 6, wherein each of the filter means has its frequency range being adjusted in response to an application of an electrical field thereto, and wherein said step of displaying includes applying an electrical field to both the filter means and the plate means to cause a change in the frequency range of both the plate means and the filter means to control the image being displayed.

8. A process according to claim 6, wherein the absorption frequency range of the filter means is substantially constant, and wherein said plate means has the fluorescent particles whose emission frequency range is switchable by the application of an electrical field between a rest state with the emission frequency range being in the absorption frequency range and an excited state with the emission frequency range being outside of the absorption frequency range of the filter means and said step of displaying comprises applying an electrical field to selected areas of the fluorescent material to alter the emission frequency range to a range outside of the absorption frequency range of the filter means so that light is passed by the filter means at these areas.

9. A process according to claim 6, wherein the absorption frequency range of the filter means is substantially constant and wherein said plate means has fluorescent particles whose frequency range of emission is changed by the application of an electrical field between a rest state with an emission frequency range which is outside of the absorption frequency range for the filter means to an excited state with an emission frequency range which is within the absorption frequency range of the filter means, and wherein the step of applying a display comprises applying electrical field to those areas of the fluorescent particles where a light image is not desired so that those areas which are in the rest state are emitting light to form the image.

* * * * *